(12) United States Patent
Kawabata et al.

(10) Patent No.: US 8,403,371 B1
(45) Date of Patent: Mar. 26, 2013

(54) SPRINKLER UNWINDING PIPING

(75) Inventors: Ichiro Kawabata, Kishiwada (JP);
Yoshiaki Minamide, Kishiwada (JP)

(73) Assignee: Nikkoh Metals Co., Ltd.,
Kishiwada-Shi (JP)

( * ) Notice: Subject to any disclaimer, the term of this patent is extended or adjusted under 35 U.S.C. 154(b) by 0 days.

(21) Appl. No.: 13/329,884

(22) Filed: Dec. 19, 2011

(51) Int. Cl.
*F16L 13/14* (2006.01)
(52) U.S. Cl. .................................. 285/382; 285/903
(58) Field of Classification Search ............... 285/903, 285/382, 382.4, 382.5
See application file for complete search history.

(56) References Cited

U.S. PATENT DOCUMENTS

| | | | | |
|---|---|---|---|---|
| 2,158,620 A | * | 5/1939 | Eastman | 285/382.4 |
| 2,323,912 A | * | 7/1943 | Johnson | 285/382 |
| 2,848,254 A | * | 8/1958 | Millar | 285/382 |
| 3,008,738 A | * | 11/1961 | Longfellow | 285/382 |
| RE25,653 E | * | 10/1964 | Longfellow | 285/382.4 |
| 6,217,082 B1 | * | 4/2001 | Orcutt et al. | 285/382.4 |
| RE37,246 E | * | 6/2001 | Ridenour | 285/382.4 |
| 6,378,914 B1 | * | 4/2002 | Quaranta | 285/903 |
| 6,543,817 B1 | * | 4/2003 | Turner et al. | 285/382.5 |

FOREIGN PATENT DOCUMENTS

| | | |
|---|---|---|
| JP | 6-235484 | 8/1994 |
| JP | 7-213640 | 8/1995 |
| JP | 9-294822 | 11/1997 |
| JP | 2005-279200 | 10/2005 |

* cited by examiner

*Primary Examiner* — David E Bochna
(74) *Attorney, Agent, or Firm* — Rankin, Hill & Clark LLP

(57) ABSTRACT

First and second ridge portions at the foremost end of a flexible pipe are pressed into first and second enlarged-diameter ridge portions, respectively, each having an external diameter larger than the internal diameter of a rotary nipple and smaller than the front-end root diameter of a taper external thread of the rotary nipple. The back surface of the second enlarged-diameter ridge portion is brought into contact with a front-end surface of the rotary nipple. A rubber seal ring is fitted into each of a first and second root portion of the flexible pipe, respectively, and an aligning ring is fitted into each of a third root portion of the flexible pipe located on the front-end side thereof from the first root portion and a fourth root portion of the flexible pipe located on the back side thereof from the second root portion, respectively.

2 Claims, 2 Drawing Sheets

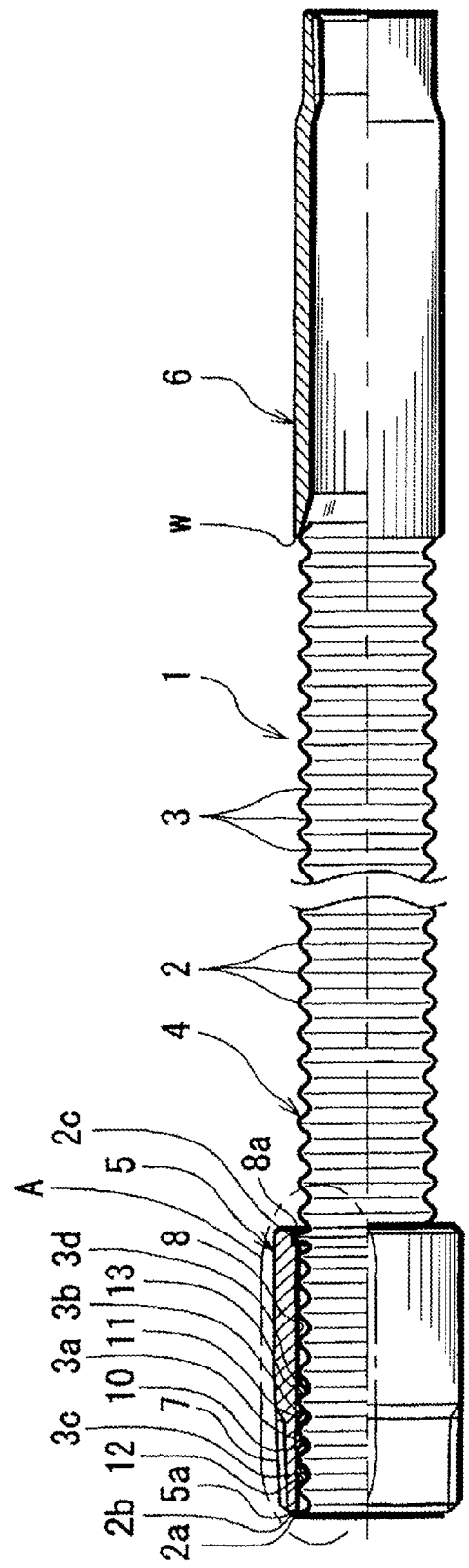

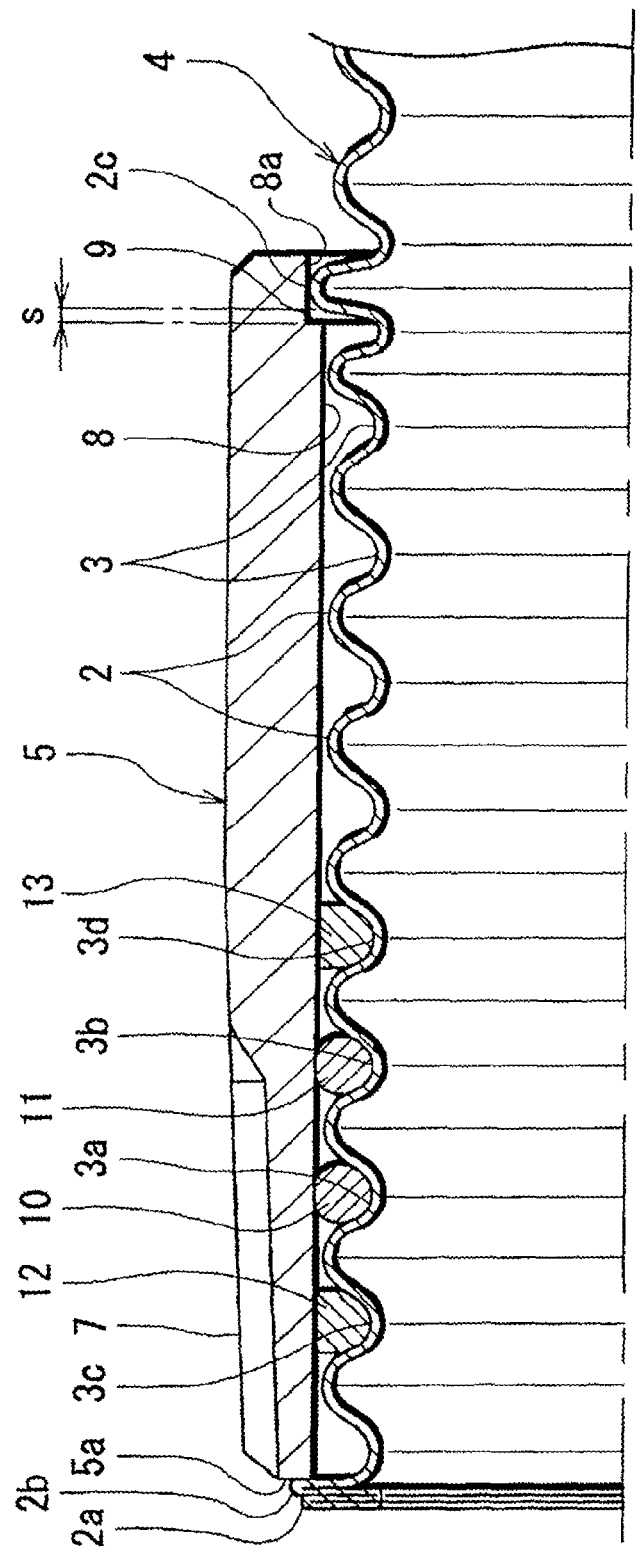

SPRINKLER UNWINDING PIPING

BACKGROUND OF THE INVENTION

1. Field of the Invention

The present invention relates to sprinkler unwinding piping connecting a water supply pipe and a sprinkler head.

2. Description of the Related Art

As this type of sprinkler unwinding piping, there is sprinkler unwinding piping which includes, for example: a flexible unwinding pipe having a required length; a union-type box nut attached to a front-end part (an upstream-end part) of the unwinding pipe, the box nut connecting the unwinding pipe and a branch joint on the side of a water supply pipe (e.g., refer to Patent Documents 1 and 2); and a sprinkler-head attachment pipe connected to a back-end part (a downstream-end part) thereof (e.g., refer to Patent Document 2 described above). However, the sprinkler unwinding piping requires a special nipple designed to be screwed to the box nut.

In recent years, in order to dispense with the special nipple, sprinkler unwinding piping has become popular in which a rotary-type nipple is attached to the connection end of a flexible unwinding pipe (a flexible pipe) on the side of a water supply pipe (e.g., refer to Patent Documents 3 and 4).

Patent Document 1 is Japanese Patent Application Laid-Open No. 6-235484, Patent Document 2 is Japanese Patent Application Laid-Open No. 7-213640, Patent Document 3 is Japanese Patent Application Laid-Open No. 2005-279200 and Patent Document 4 is Japanese Patent Application Laid-Open No. 9-294822.

However, in the sprinkler unwinding piping provided with the rotary-type nipple, a metallic sleeve member (Patent Document 3) or a resinous sleeve member (Patent Document 4) is integrally bonded in welding or resinous integral molding to the connection end of the unwinding pipe on the side of the water supply pipe, and onto the external-circumference part of the sleeve member, the rotary-type nipple is externally fitted via a seal ring and a non-slip ring. This structure is employed, and hence, the sleeve member and the non-slip ring are required to increase the number of members and the man-hours taken for the assembly thereof.

SUMMARY OF THE INVENTION

The invention has been conducted in order to solve the problems. It is an object of the invention to provide sprinkler unwinding piping which is capable of, in a simple configuration using ridge and root portions of an unwinding pipe formed by a flexible pipe, allowing a seal ring to securely seal a gap between the unwinding pipe and a rotary nipple and certainly preventing the rotary nipple from slipping out, and simultaneously, dispensing with a sleeve member or a non-slip ring, as is employed in Patent Documents 3 and 4 described above, and hence, decreasing the number of members and reducing the cost thereof.

The sprinkler unwinding piping of a first aspect of the invention will be described with reference to the characters and numerals given to FIGS. 1 and 2 for the purpose of making the subject matter of the invention easily understandable.

The sprinkler unwinding piping includes: a flexible pipe 4; and a rotary nipple 5 fitted externally onto a front-end part of the flexible pipe 4, in which the rotary nipple 5 is provided with a taper external thread 7 narrowing forward in a front-end external-circumference part of the rotary nipple 5, a first ridge portion 2a at the foremost end of the flexible pipe 4 and a second ridge portion 2b adjacent thereto are pressed into first and second enlarged-diameter ridge portions 2a and 2b respectively each having an external diameter larger than the internal diameter of the rotary nipple 5 and smaller than the front-end root diameter (the minimum external diameter) of the taper external thread 7 of the rotary nipple 5, and the back surface of the second enlarged-diameter ridge portion 2b is brought into contact with a front-end surface 5a of the rotary nipple 5, directly or via some inclusion such as a washer and a third enlarged-diameter ridge portion formed by pressing a third ridge portion. Then, a first root portion 3a and a second root portion 3b of the flexible pipe 4 are located in the region thereof covered with the rotary nipple 5, the second root portion 3b being on the back side of the flexible pipe 4 from the first root portion 3a, and between each of the first and second root portions 3a and 3b and the internal-circumference part of the rotary nipple 5, a rubber seal ring 10, 11 is fitted respectively so as to seal the gap therebetween. Further, a third root portion 3c of the flexible pipe is located on the front-end side thereof from the first root portion 3a and a fourth root portion 3d of the flexible pipe is located on the back side thereof from the second root portion 3b, and an aligning ring 12, 13 is fitted into each of the third root portion 3c and the fourth root portion 3d respectively.

In the sprinkler unwinding piping configured as described above, the back surface of the second enlarged-diameter ridge portion 2b having an external diameter larger than the internal diameter of the rotary nipple 5 is in contact with the front-end surface 5a of the rotary nipple 5. Therefore, the rotary nipple 5 can be prevented, without a non-slip ring or the like, from moving forward in the pipe-axis directions of the flexible pipe 4 and slipping out thereof. Further, the first and second enlarged-diameter ridge portions 2a and 2b each have an external diameter smaller than the front-end root diameter (the minimum external diameter) of the taper external thread 7 of the rotary nipple 5. Therefore, the taper external thread 7 of the rotary nipple 5 can be screwed without trouble into a branch joint on the side of a water supply pipe. Still further, the first and second enlarged-diameter ridge portions 2a and 2b brought into contact with the front-end surface 5a of the rotary nipple 5 have a dual structure. Therefore, the strength thereof is raised, and thereby, the rotary nipple 5 can be more certainly prevented from slipping out.

In addition, between each of the first and second root portions 3a and 3b and the internal-circumference part of the rotary nipple 5, the rubber seal ring 10, 11 is fitted respectively so as to seal the gap therebetween, and the aligning rings 12 and 13 are arranged on the front and back sides respectively from the seal rings 10 and 11. The aligning rings 12 and 13 have a self-aligning function, which is useful for effectively preventing the flexible pipe 4 from being shaken. Inside of the rotary nipple 5, the flexible pipe 4 may be inclined or subjected to such another by the pressure of water enclosed therein and shaken in the radial directions thereof, thereby forcing the seal rings 10 and 11 partly out of the first and second root portions 3a and 3b and leaking the enclosed water. However, using the aligning rings 12 and 13, this situation can be effectively and certainly prevented from occurring.

The sprinkler unwinding piping of a second aspect of the invention is configured such that in the first aspect, an internal-diameter part 8 of the rotary nipple 5 is enlarged at the back-end opening thereof to form an enlarged back-end opening portion 8a larger than the internal-diameter part 8, a step portion 9 is formed between the internal-diameter part 8 and the enlarged back-end opening portion 8a, a third ridge portion 2c of the flexible pipe 4 located inside of the enlarged back-end opening portion 8a of the rotary nipple 5 is pressed into a third enlarged-diameter ridge portion 2c having an external diameter larger than the internal diameter of the internal-diameter part 8 of the rotary nipple 5, and the third enlarged-diameter ridge portion 2c protrudes within the enlarged back-end opening portion 8a.

According to this configuration, the rotary nipple 5 can be restrained, without a non-slip ring or the like, from moving backward in the pipe-axis directions of the flexible pipe 4 and slipping back out of the front-end region of the flexible pipe 4.

The invention has the advantage of obtaining sprinkler unwinding piping which is capable of allowing a seal ring to securely seal a gap between a flexible pipe and a rotary nipple and certainly preventing the rotary nipple from slipping out; dispensing with a sleeve member or a non-slip ring, as is employed in Patent Documents 3 and 4 described above, and hence, decreasing the number of members and reducing the cost thereof; and omitting welding work for a sleeve member, as is conducted in Patent Document 3.

BRIEF DESCRIPTION OF THE DRAWINGS

FIG. 1 is a half-broken sectional view of sprinkler unwinding piping of an embodiment of the invention.
FIG. 2 is an enlarged view of the part indicated by A in FIG. 1.

DESCRIPTION OF THE PREFERRED EMBODIMENT

A preferred embodiment of the invention will be below described with reference to the drawings.

As shown in FIG. 1, sprinkler unwinding piping 1 of the invention includes: a flexible pipe 4 made of metal such as stainless steel and having ridge portions 2 and root portions 3, the ridge portion 2 and the root portion 3 extending over the full circumference in the circumferential directions and being alternately arranged in the pipe-axis directions thereof; a rotary nipple 5 made of metal such as stainless steel and fitted externally onto a front-end part (an upstream-end part) of the flexible pipe 4, the rotary nipple 5 being screwed into the internal-thread part of a branch joint on the side of a water supply pipe (not shown); and a reducer pipe 6 made of metal such as stainless steel and having a linear or bend shape, the reducer pipe 6 being integrally bonded in welding w to a back-end part (a downstream-end part) of the flexible pipe 4 and screwed on the external-thread part of a sprinkler head (not shown).

As shown in FIGS. 1 and 2, the rotary nipple 5 is provided with a taper external thread 7 narrowing forward in a front-end external-circumference part thereof. An internal-diameter part 8 of the rotary nipple 5 is enlarged at the back-end opening thereof to form an enlarged back-end opening portion 8a larger than the internal-diameter part 8, and a step portion 9 is formed between the internal-diameter part 8 and the enlarged back-end opening portion 8a.

The rotary nipple 5 which has a lubricating material such as silicone grease applied to the internal surface thereof is fitted onto the front-end part of the flexible pipe 4. Thereafter, a first ridge portion 2a at the foremost end of the flexible pipe 4 and a second ridge portion 2b adjacent to the first ridge portion 2a are each enlarged so as to have a larger diameter. Diameter-enlargement working for the first and second ridge portions 2a and 2b is conducted using diameter enlarging equipment (not shown), and thereby, the first and second ridge portions 2a and 2b are pressed so that the internal diameters thereof are each enlarged by a predetermined increment. In this way, first and second enlarged-diameter ridge portions 2a and 2b are formed, and the back surface of the second enlarged-diameter ridge portion 2b is brought into contact with a front-end surface 5a of the rotary nipple 5. Therefore, without a non-slip ring or the like, the rotary nipple 5 can be prevented from slipping out. In this case, if the first and second enlarged-diameter ridge portions 2a and 2b are each formed by too small an increment in the internal diameter, then the pressure (e.g., a maximum value of 5.6 MPa=a tensile force of approximately 280 Kgf) of water enclosed in the flexible pipe 4 may force the rotary nipple 5 to slip out thereof. On the other hand, if they are each formed by too large an increment in the internal diameter, then the external diameters of the first and second enlarged-diameter ridge portions 2a and 2b may reach the front-end root diameter (the minimum external diameter) of the taper external thread 7 of the rotary nipple 5, thereby hindering the taper external thread 7 of the rotary nipple 5 from being screwed into the internal thread of a branch joint on the side of a water supply pipe (not shown).

Taking this into account, the maximum external diameter of each of the first and second enlarged-diameter ridge portions 2a and 2b is designed to be considerably larger than the internal diameter of the internal-diameter part 8 of the rotary nipple 5 and be smaller than the front-end root diameter (the minimum external diameter) of the taper external thread 7 of the rotary nipple 5.

As shown in FIG. 2, in the front-end region of the flexible pipe 4 covered with the rotary nipple 5, there are one root portion defined as a first root portion 3a and another root portion defined as a second root portion 3b located one ridge or two or more ridges away from the first root portion 3a on the backside of the flexible pipe 4, and between each of the first and second root portions 3a and 3b and the internal-circumference part of the rotary nipple 5, a rubber seal ring 10, 11 respectively is compressed-and-deformed and fitted so as to seal up the gap therebetween. Further, a third root portion 3c of the flexible pipe 4 is located on the front-end side thereof from the first root portion 3a and a fourth root portion 3d of the flexible pipe 4 is located on the back side thereof from the second root portion 3b, and an aligning ring 12, 13 made of resin or metal is fitted into each of the third and fourth root portions 3c and 3d respectively. The aligning rings 12 and 13 each have, in cross section, a round shape lacking a part of the circumference part thereof. After the seal rings 10 and 11 and the aligning rings 12 and 13 each formed by an O-ring are attached as described above to the flexible pipe 4, a lubricating material such as silicone grease is applied to the external-circumference surface of each of the seal rings 10 and 11 and the aligning rings 12 and 13, so that the rotary nipple 5 can be more easily rotated.

The external diameter of each of the aligning rings 12 and 13 in a free state (a state where the aligning rings 12 and 13 are each not deformed so that the diameter thereof is enlarged or narrowed, and a compressive stress or a tensile stress is not working thereon) is slightly smaller than the internal diameter of the internal-diameter part 8 of the rotary nipple 5, and the internal diameter thereof in the free state is slightly smaller than the root external diameter of each of the third root portion 3c and the fourth root portion 3d of the flexible pipe 4. Therefore, when the aligning rings 12 and 13 are attached to the third and fourth root portions 3c and 3d of the flexible pipe 4 respectively, the internal-diameter parts of the aligning rings 12 and 13 can be pressed onto the root external-diameter parts of the third and fourth root portions 3c and 3d respectively so as to certainly come into contact therewith. This makes it possible to easily push and fit the rotary nipple 5 onto the front-end part of the flexible pipe 4.

In this way, the aligning rings 12 and 13 are arranged on the front and back sides from the seal rings 10 and 11 respectively, and thereby, when the sprinkler unwinding piping 1 is kept connected to a branch joint on the side of a water supply pipe (not shown) and a sprinkler head (not shown), the self-aligning function of the aligning rings 12 and 13 is useful for effectively preventing the flexible pipe 4 from being shaken. This makes it possible to effectively and certainly prevent a situation in which inside of the rotary nipple 5, the flexible pipe 4 is inclined or subjected to such another by the pressure of water enclosed therein and shaken in the radial directions thereof and thereby the seal rings 10 and 11 are partly forced out of the first and second root portions 3a and 3b to leak the enclosed water.

The rotary nipple 5 has to be prevented from moving backward in the pipe-axis directions of the flexible pipe 4 and slipping out of the front-end region of the flexible pipe 4 toward the back in the pipe-axis directions. In order to restrain the rotary nipple 5 from moving backward, one or two third ridge portions 2c of the flexible pipe 4 located inside of the enlarged back-end opening portion 8a of the rotary nipple 5 is pressed into a third enlarged-diameter ridge portion 2c having an external diameter larger than the internal diameter of the internal-diameter part 8 of the rotary nipple 5, and the third enlarged-diameter ridge portion 2c protrudes within the enlarged back-end opening portion 8a. At this time, when the back surface of the second enlarged-diameter ridge portion 2b is in contact with the front-end surface 5a of the rotary nipple 5, a slight clearance s is formed between the step portion 9 of the rotary nipple 5 and the third enlarged-diameter ridge portion 2c of the flexible pipe 4. This permits the flexible pipe 4 to slightly elongate and move in the pipe-axis directions thereof by the pressure of water enclosed therein.

What is claimed is:

1. Sprinkler unwinding piping, comprising:
   a flexible pipe; and
   a rotary nipple fitted externally onto a front-end part of the flexible pipe, wherein
   the rotary nipple is provided with a taper external thread narrowing forward in a front-end external-circumference part of the rotary nipple,
   a first ridge portion at the foremost end of the flexible pipe and a second ridge portion adjacent thereto are pressed into first and second enlarged-diameter ridge portions respectively each having an external diameter larger than the internal diameter of the rotary nipple and smaller than the front-end root diameter of the taper external thread of the rotary nipple,
   the back surface of the second enlarged-diameter ridge portion is brought into contact with the front-end surface of the rotary nipple,
   a first root portion and a second root portion of the flexible pipe are located in the region thereof covered with the rotary nipple, and between each of the first and second root portions and the internal-circumference part of the rotary nipple, a rubber seal ring is fitted so as to seal the gap therebetween, and
   a third root portion of the flexible pipe is located on the front-end side thereof from the first root portion and a fourth root portion of the flexible pipe is located on the back side thereof from the second root portion, and an aligning ring is fitted into each of the third root portion and the fourth root portion.

2. The sprinkler unwinding piping according to claim 1, wherein the internal-diameter part of the rotary nipple is enlarged at the back-end opening thereof to form an enlarged back-end opening portion larger than the internal-diameter part, a step portion is formed between the internal-diameter part and the enlarged back-end opening portion, a third ridge portion of the flexible pipe located inside of the enlarged back-end opening portion of the rotary nipple is pressed into a third enlarged-diameter ridge portion having an external diameter larger than the internal diameter of the internal-diameter part of the rotary nipple, and the third enlarged-diameter ridge portion protrudes within the enlarged back-end opening portion.

* * * * *